United States Patent [19]

Inoue

[11] 4,335,294
[45] Jun. 15, 1982

[54] EDM METHOD AND APPARATUS HAVING A GAP DISCHARGE CIRCUIT CONSTRUCTED WITH LIMITED STRAY CAPACITANCES

[75] Inventor: Kiyoshi Inoue, Tokyo, Japan

[73] Assignee: Inoue-Japax Research Incorporated, Yokohama, Japan

[21] Appl. No.: 171,943

[22] Filed: Jul. 24, 1980

[30] Foreign Application Priority Data

Jul. 25, 1979 [JP]  Japan .................................. 54/94737
Jul. 25, 1979 [JP]  Japan .................................. 54/94738
Jul. 25, 1979 [JP]  Japan ................................. 54/106164

[51] Int. Cl.³ .............................................. B23P 1/08
[52] U.S. Cl. ................................. 219/69 M; 219/69 P; 219/69 C; 328/75; 315/227 A; 315/227 R
[58] Field of Search ................. 219/69 P, 69 C, 69 E, 219/69 F, 69 M; 328/59, 66, 75; 315/227 A, 241 R

[56] References Cited

U.S. PATENT DOCUMENTS

| 3,056,065 | 9/1962 | Porterfield | 219/69 P X |
| 3,292,040 | 12/1966 | Ullmann et al. | 315/227 A |
| 4,163,887 | 8/1979 | Buhler et al. | 219/69 P |
| 4,237,370 | 12/1980 | Ullman | 219/69 P |

FOREIGN PATENT DOCUMENTS 1164315  9/1969  United Kingdom ............. 219/69 C

Primary Examiner—Bruce A. Reynolds
Assistant Examiner—M. Paschall
Attorney, Agent, or Firm—Karl F. Ross

[57] ABSTRACT

An EDM method and apparatus for machining a workpiece electrode with a tool electrode wherein a solid-state switching type EDM generator provides a succession of machining current pulses across a machining gap formed between the electrodes flooded with a liquid dielectric, preferably distilled water or a weakly conductive aqueous liquid, through a gap discharge circuit. The total value of stray capacitances in the gap discharge circuit is limited to be less than 0.01 microfarad, preferably at most 0.005 or 0.001 microfarad, to control a rise of peak current at the leading edge of each individual machining current pulse. The gap current at the leading edge of a pulse may be sensed and discriminated to provide a control signal which acts on the DC power supply to control the output voltage thereof so that the initial rise of peak current may be maintained substantially constant, irrespective of a change in the stray resistance in the gap discharge circuit during a given course of machining operation.

25 Claims, 10 Drawing Figures

EDM METHOD AND APPARATUS HAVING A GAP DISCHARGE CIRCUIT CONSTRUCTED WITH LIMITED STRAY CAPACITANCES

FIELD OF THE INVENTION

The present invention relates to an EDM (electrical discharge machining) method and apparatus and, more particularly, to an improved method and apparatus for electrical discharge machining with a solid-state or semiconductor switching type EDM power supply or pulse generator for furnishing a succession of electrical machining pulses to an EDM gap formed between a tool electrode and a workpiece wherein the pulses are passed through the gap in an accurately prescribed machining (current) waveform—rectangular or any other desired shape—dictated by pulse forming circuitry in the power supply and without substantial distortion thereof by the gap discharge circuit connecting the power supply to the machining gap.

BACKGROUND OF THE INVENTION

In an EDM process, electric energy is furnished from the power supply in the form of discrete electrical pulses across the machining gap filled with a machining fluid or liquid dielectric (e.g., kerosene, transformer oil, distilled water or a weakly conductive aqueous liquid) to effect a succession of electrical discharges between the tool electrode and the workpiece to remove material from the latter. Each individual discharge strikes that area of the workpiece juxtaposed with the tool electrode on one minute localized zone or another, the zone being impulsively melted and/or vaporized and then mechanically dislodged from the workpiece area by the impulsive discharge pressure. Successive and repetitive discharges are used to sweep the localized material removal action over the entire workpiece area and result in the formation of cumulatively overlapped discharge craters thereon. As material removal proceeds, the tool electrode is advanced relatively towards the workpiece by servo feed means adapted to maintain the machining gap spacing substantially constant and thereby to allow material removal discharges to be successively created. The tool electrode in sinking-type EDM is generally formed with the desired configuration of the cavity or shape complementarily desired in the workpiece. Thus, the total surface eventually juxtaposed with the tool is machined over those portions thereof which confront the tool electrode and receives a configuration conforming to the shape of the tool electrode. In traveling-wire or wire-cut EDM in which the tool electrode is formed by a continuous, axially traveling elongate wire-like electrode or in scanning-type EDM using a rod or the like electrode having a relatively simple machining contour, a two- or three-dimensional relative displacement is effected between the electrode and the workpiece to yield a desired shaped configuration in or on the workpiece corresponding to the path of the relative displacement. The contamination of the machining gap region with chips, tar and gases produced by machining discharges may be clarified by continuously or intermittently flushing the gap with a fresh machining fluid and/or intermittently or cyclically retracting the tool electrode away from the workpiece to allow the fresh machining medium to be pumped into the machining gap and the machining contaminants to be carried away from the latter.

Parameters of individual and successive electrical discharges or machining current pulses, especially pulse on-time $\tau on$ and peak curent Ip are, for a given combination of electrode materials and other machining settings, determinative of stock removal characteristics per single pulse delivery and hence of critical machining results, i.e. removal rate, surface roughness and relative electrode wear and, therefore, must be adjusted, in conjunction with pulse off-time, to establish a particular machining condition suitable to yield the desired machining results. These parameters are adjusted individually at pulse source circuitry in the power supply or a pulse generator which is, preferably, of solid-state or semiconductor switching type.

I have observed that in a conventional EDM machine, however accurately the setting of these parameters is done at the pulse source in the power supply, the pulses become distorted while being generated and transmitted to the gap through the gap discharge circuit. I have observed that the distortion is brought about due to stray capacitances inherently distributed in the gap discharge circuitry. This circuitry can include a semiconductor power switching network for pulsing a DC source, various leads in the power supply, cables connecting the power switch to the gap site and conductors leading from the power cables for directly energizing the tool electrode and workpiece, and also to some extent environmental circuit units for mechanical arrangements. Heretofore, little care has been exercised with respect to these stray capacitances on the part of the power supply and mechanical components in electrical machining operations. I have now noted that these stray capacitances have significant influences which cannot be neglected on the characteristics of a discharge pulse which eventually develops across the machining gap.

Specifically, stray capacitances are generated generally at the interfaces between the emitter and body of a semiconductor element in the switch unit for pulsing a DC power supply to produce the power pulses and between the parallel conductors in a printed circuit board, leading cables and at the portions of insulators for the electrode supporting head and for the workpiece support. In total the stray capacitances have been found to amount to 0.1 microfarad or so in conventional EDM machines. I have discovered that the presence of stray capacitances of such levels is a significant cause of the tendency towards the gap short-circuiting and arcing, the development of machining the instability, inability to increase the removal rate, the excessive electrode wear and the unsatisfactory machined surface quality which may be encountered.

OBJECTS OF THE INVENTION

It is, accordingly, an important object of the present invention to provide an improved EDM method and apparatus which afford better machining performance, an increased removal rate, a reduced tool wear and an improved machined surface quality.

Another object of the present invention is to provide an improved EDM method and apparatus which enable a fine finishing to be achieved with an extremely low wear of the tool electrode.

SUMMARY OF THE INVENTION

These objects and others which may become apparent hereinafter are attained, in accordance with the present invention, by providing, in a first aspect thereof, a method of electrical-discharge-machining of a workpiece electrode juxtaposed with a tool electrode across a machining gap flooded with a liquid dielectric, preferably a distilled or weakly conductive aqueous liquid, wherein a succession of machining pulses are applied across the machining gap through a gap discharge circuit by repetitively pulsing the output of a direct-current source by means of a semiconductor switching unit. According to the invention the total value of stray capacitances in the gap discharge circuit is limited to be not greater than 0.01 microfarad, preferably less than 0.005 or at most 0.001 microfarad.

Specifically, the gap discharge circuit includes a plurality of pairs of electrical conductors each separated by an insulating layer, e.g. substantially parallel conductors on one or more of printed circuit boards in a pulse generator unit; one conductor on a printed circuit board and another conductor juxtaposed with said one conductor in a mutually insulating relationship, said conductors forming a portion of said pulse generator unit containing said semiconductor switching unit; and a pair of cables connecting the two output terminals of said pulse generator unit respectively to said tool and workpiece electrodes; and one conductor on the side of said tool electrode to energize the same from the corresponding one of said cables and another conductor electrically separated from said one conductor and connected to ground; and one conductor on the side of said workpiece electrode to energize the same from the corresponding one of said cables and another conductor electrically separated from said one conductor and connected to ground. In embodying the principles and the foregoing general feature in a first aspect of the present invention, the distance between the conductors of at least one of said pairs of conductors is enlarged so as to limit the total stray capacitance value in said gap discharge circuit to be not greater than 0.01 microfarad, preferably less than 0.005 microfarad or at most 0.001 microfarad.

Preferably, the stray capacitance on both of said tool and workpiece electrode sides energized by said cables and the associated conductors connected to ground is reduced to be not greater than 100 picofarads (0.0001 microfarad).

Concomittant to the aforementioned first aspect thereof, the invention provides an EDM method of the type described wherein each machining current pulse has an increased peak current at an initial portion thereof due to the fact that an electrostatic energy stored on said capacitances or a capacitor equivalently constituted thereby during the preceding pulse interval is discharged through the machining gap when said machining pulse is applied to said gap. According to the invention the magnitude of said peak current is measured and the output voltage of said direct-current source is controlled in response to the measured value of said magnitude to maintain said increased peak current substantially constant, irrespective of a change in the stray capacitance value in said gap discharge circuit during a given course of machining operation.

In a second aspect thereof, the invention also provides an apparatus for the electrical-discharge-machining of a workpiece electrode juxtaposed with a tool electrode across a dielectric filled machining gap, comprising a direct-current source, and a pulse generator including said direct-current source and a semiconductor switching unit intermittently operable to repetitively pulse the output of said direct-current source for providing a succession of machining current pulses across the machining gap through a gap discharge circuit. According to the invention the gap discharge circuit has the total valve of stray capacitances therein limited to be not greater than 0.01 microfarad and preferably at most 0.005 or 0.001 microfarad.

Concomittant to the aforementioned second aspect thereof, the invention provides an EDM apparatus wherein each machining current pulse has an increased peak current at an initial portion thereof due to the fact that an electrostatic energy stored on said stray capacitances or a capacitor equivalently constituted thereby during the preceding pulse interval is discharged through the machining gap when said machining pulse is applied to said gap, the apparatus comprising means for sensing the magnitude of said initial peak current and means responsive to the sensed value of the measured magnitude for controlling the voltage output of said direct-current source so as to maintain said initial peak current substantially constant, irrespective of a change in the stray capacitance value in said gap discharge circuit during a given course of machining operation.

BRIEF DESCRIPTION OF THE DRAWING

These and other objects, features and advantages of the present invention will be more readily understood from the following description taken with reference to the accompanying drawing in which.

SPECIFIC DESCRIPTION

Figure 1:
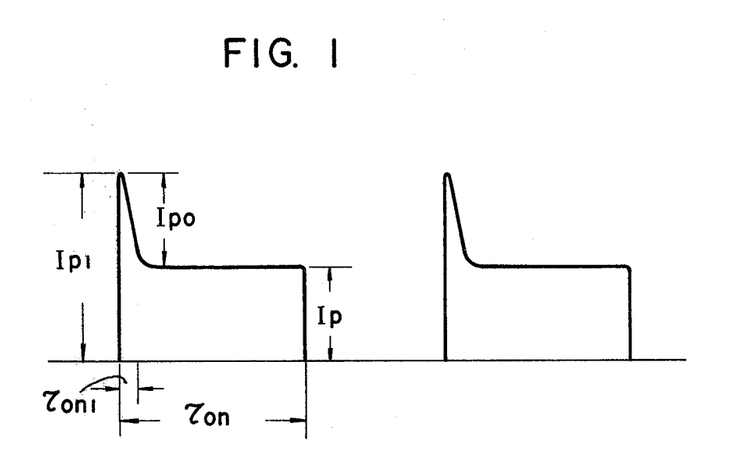
FIG. 1 is a waveform diagram schematically illustrating a discharge or machining current pulse which develops across an EDM gap as distorted due to stray capacitances commonly present in the discharge circuit in a conventional EDM machine.

In conventional EDM machines, stray capacitances are generated generally at the interfaces between the emitter and body of a semiconductor element in the switch unit for pulsing a DC power supply and between parallel conductors in a printed circuit board carrying the switch and other circuit elements, leading cables and at the portions which electrically insulate the conductive electrode holder and workpiece support from ground. In total these capacitances amount to 0.1 microfarad or so. On the other hand, it has been recognized that a pulse discharge generated across the machining gap has a distorted current waveform as shown in FIG. 1. I have recognized this to be due to the presence of those stray capacitances inherently present in the gap discharge circuit. In FIG. 1, it is shown that the pulse comprises a portion of a peak current Ip and a duration $\tau on$ produced when the DC EDM power supply is pulsed by means of the on-off switch and a portion of a peak current Ip ($=I_{po}+I_p$) and a duration $\tau on1$ added at the leading edge of the pulse due to these stray capacitances. The additional current $I_{po}$ superimposed on the pulse peak current $I_p$ to produce the added peak current $I_{p1}$ and the time $\tau on1$ are expressed as follows:

$$I_{po} \sim E\sqrt{C/L} \ldots \quad (1)$$

$$\tau on1 \sim E\sqrt{LC} \ldots \quad (2)$$

where C is the stray capacitance in total, L is the inductance and E is the source voltage. It is seen that both $I_{p1}$ and $\tau on1$ increase as the stray capacitance C becomes greater; a machine with a large C has a large $I_{p1}$ which means a large deviation of the effective peak current $I_{peff}$ from a preset value $I_p$ which in turn represents a significant change in operation settings to conform to a desired machining result. For example, surface roughness is given by the formula:

$$R = K_R I_{Peff}^{0.4} \tau on^{0.3} \quad (3)$$

where $K_R$ is constant. Removal rate is given by the formula:

$$W = K_W I_{peff}^{1.4} \tau on^{1.1} \quad (4)$$

where $K_W$ is constant. Thus, it is apparent that momentous changes are caused in these desired EDM end factors with a change in the effective peak current $I_{peff}$ caused by the addition of $I_{p1}$ to the preset $I_p$. The change or influence is especially great in finish operations in general and also in wire-cut and other EDM operations in general using a water (distilled or weakly conductive) machining liquid having a relatively high specific inductive capacitance.

Figure 2:
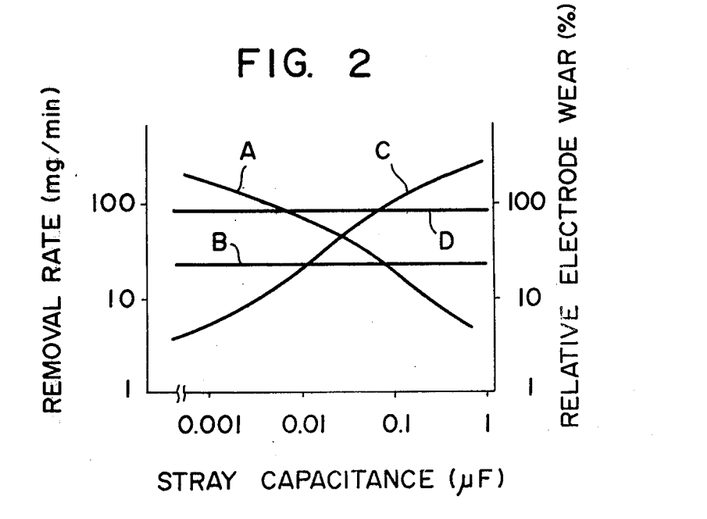
FIG. 2 is a graph illustrating the relationship of stray capacitance versus removal rate and relative electrode wear experimentally derived in an EDM operation.

In FIG. 2 there is shown a graph, experimentally obtained, showing how stray capacitance affects EDM end factors. In the graph, stray capacitance in microfarad is plotted along the abscissa while removal rate in mg/min and relative wear in weight % are plotted along the ordinate. Tests were conducted to machine a ferrous workpiece with a copper electrode and an aqueous machining fluid having a specific resistivity of $4 \times 10^{-4}$ ohm-cm, using machining pulses obtained by pulsing a direct current by means of a transistor switch and having a duration $\tau on$ of 4 microseconds, a pulse interval $\tau off$ of 6 microseconds and a peak current $I_p$ of 10 amperes. In the graph, the curve A represents the removal rate obtained in the case where the electrode is poled positive and the workpiece is poled negative; from this curve the removal rate is seen to increase as the stray capacitance is decreased. The curve C represents the relative electrode wear obtained in that case and which is seen to decrease as the stray capacitance is decreased. The curves B and D in the graph represent the removal rate and relative electrode wear, respectively, when the electrode is poled negative and the workpiece is poled positive; both of these parameters are substantially constant with respect to the change in the stray capacitance.

From the graph it can be seen that the removal rate A in one polarity in which the electrode is poled positive and the workpiece is poled negative exceeds the removal rate B in the opposite polarity where the stray capacitance falls slightly below 0.1 microfarad. The relative electrode wear C in that one polarity is exceeded by the relative electrode wear D in that opposite polarity where the stray capacitance becomes less than about 0.05 microfarad. Since the curves C and D are basically constant relative to the stray capacitance, it is seen that it is advantageous to limit the stray capacitance to be not greater than about 0.01 microfarad for both polarities. Especially in machining operations of that one polarity, a removal rate and relative electrode wear respectively in the maximum and minimum ranges are then obtained. For example, when the stray capacitance is reduced from 0.1 microfarad to 0.01 microfarad, the removal rate (current A) is increased approximately four times and the relative electrode wear (curve C) is reduced to approximately 1/10. The increase in machining performance is particularly remarkable in wire-cut and other EDM operations using water (distilled or weakly conductive) as the machining fluid. Investigations with various other electrode and workpiece materials have shown a basically similar tendency.

It has been observed that when the added $I_{p1}$ due to the stray capacitance C is increased, the tendency towards gap short-circuiting and arcing increases. This reduces the machining stability and hence removal rate, and also increases the electrode wear. It appears that more material stock is melted and dislodged from the electrode due to the increased peak current $I_{p1}$, a fact which, coupled with the reduced removal rate, is believed to cause the increased relative electrode wear in the case of the greater stray capacitance inherent in conventional EDM machines.

In view of the foregoing, the present invention provides a new and useful EDM method wherein the total (effective) value of stray capacitances in the gap discharge circuit connecting to the machining gap a power switch for pulsing the output current of a power supply is limited to be not greater than 0.01 microfarad and preferably at most 0.005 or 0.001 microfarad.

Figure 3:
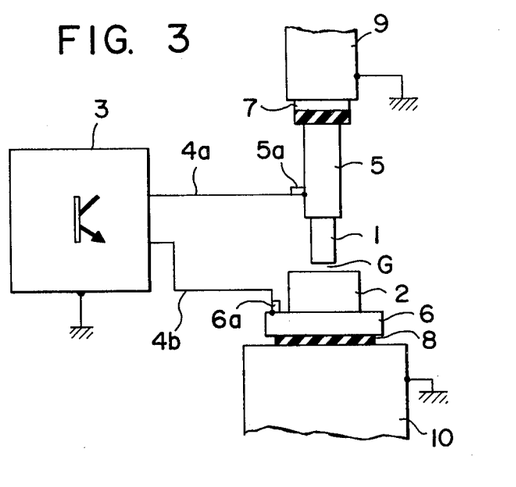
FIG. 3 is a schematic diagram illustrating an EDM gap discharge circuit for the explanation of the principles of the present invention.

FIG. 3 shows an EDM gap discharge circuit for the explanation of principles of the present invention as embodied in certain exemplary forms thereof. A tool electrode 1 and a workpiece electrode 2 are shown to be juxtaposed with one another to form a machining gap G therebetween. The gap G is flooded with a dielectric liquid, preferably a distilled or weakly conductive water, which serves as the EDM machining medium and also to carry away chips, tar and gases produced in the machining gap G and keep the latter region substantially decontaminated during a course of EDM operation. A succession of machining pulses of a preselected pulse (current) duration $\tau on$ and a peak current $I_p$ are provided by an EDM pulse generator, shown by a block 3, which includes a bank of power transistors symbolically shown and one or more printed boards, wire leads and other circuit components not shown. The generator 3 has a first output terminal electrically connected to the tool electrode 1 via a cable 4a and an electrode conductor 5a which may be located on the surface of an electrically conductive tool holding spindle 5 as shown. The other output terminal of the generator 3 is electrically connected to the workpiece 2 via a cable 4b and a work conductor 6a attached on an electrically conductive worktable 6 on which the workpiece 2 is fixedly mounted. The electrode spindle 5 is mechanically coupled and carried via an electrical insulator 7 by a ram 9 of the machine which is grounded while the worktable 6 is mechanically coupled and carried via an electrical insulator 8 by a base 10 of the machine which is grounded. The EDM generator unit 3 is also grounded.

In the above arrangement, I limit the effective value of stray capacitance measured across the tool electrode 1 and the workpiece 2 to be not greater than 0.01 microfarad and preferably at most 0.005 or 0.001 microfarad.

In the conventional EDM machine, the stray capacitances which ensue from the insulation of the electrode support spindle 5 and the worktable 6 to the ground are in both at most 2000 picofarads (0.002 microfarad) but those present in the generator 3 and cables 4a and 4b are quite large. For example, assume for a printed board having a thickness (standard) of 0.6 mm, a specific inductive capacity ($\epsilon r$) of 8 and a juxtaposed area between its main line and the ground of 10 cm$^2$; then the stray capacitance C1 becomes about 45 picofarads and, if thirty (30) similar printed boards are used, the total stray capacitance C1 there alone amounts to about 1500 picofarads. The stray capacitance C2 generated between a power transistor 3 as shield-wired and output cables 4a and 4b becomes 200 picofarads; if thirty (30) power transistors are used in total, it then amounts to 6000 picofarads in total. The same number of power transistors which inherently possess a capacitance of 50 picofarads per unit bring about a total stray capacitance C3 of 1500 picofarads. Further, the cables 4a and 4b which are of a stray capacitance of 500 picofarads give rise to a total stray capacitance C4 of 1000 picofarads while other conductors and wires in the generator 3 produce a stray capacitance C5 of 2000 picofarads across their spacings. Thus, in the pulse generator 3 with the output cables 4a and 4b, a total capacitance of C1+C2+C3+C4+C5=0.012 microfarad would inherently be present. This amount is further increased to about 0.02 microfarads if the cables, 4a and 4b, as is typical, are shield-wired to connect the power transistors 3 to the electrode support 5 and the worktable 6. Thus, with the mechanical portions 7, 9; 8, 10 inclusive which are directly associated with the energized tool electrode 1 and workpiece 2, it can be seen that a stray resistance in excess of 0.02 microfarads in total is inherently present in a gap discharge circuit of a conventional EDM machine.

The discovery shown in the graph of FIG. 2 now dictates why the conventional EDM gap circuit arrangement is defective for the reason of a large inherent stray capacitance present as shown above. In accordance with the present invention, a greatly enhanced machining performance is attained by limiting the stray capacitance in total in the entire gap discharge circuit to be not more than 0.01, 0.005 or 0.001 microfarad. This can be done, for example, by increasing the thickness of a printed board and the distance between conductors thereon in the pulse generator unit 3, increasing the distance between its output cables 4a and 4b respectively connected to the electrode conductors 5a and 6a and increasing the thickness of one or both of the insulators 7 and 8 separating the conductors 5 and 6, respectively, from the ground so that the requirement of the total capacitance for at most 0.01 microfarad, preferably 0.005 microfarad and more preferably 0.001 microfarad in the entire gap discharge circuit may be met. For example, when the gap discharge circuit has the stray capacitance reduced to 200 picofarads (0.0002 microfarad) in this way to carry away a finish machining operation for a surface roughness of 3 $\mu$Rmax, it has been found that the relative electrode wear is less than 3%. In comparison, the corresponding relative electrode wear with a conventional gap discharge circuit inherently possessing a total stray capacitance of 0.02 microfarad was 200 to 300%. It can be seen therefore that the method according to the invention allows the finish operation to be performed with a extremely reduced tool electrode wear and thus permits a fine and precision operation in no-wear mode.

Figure 4:
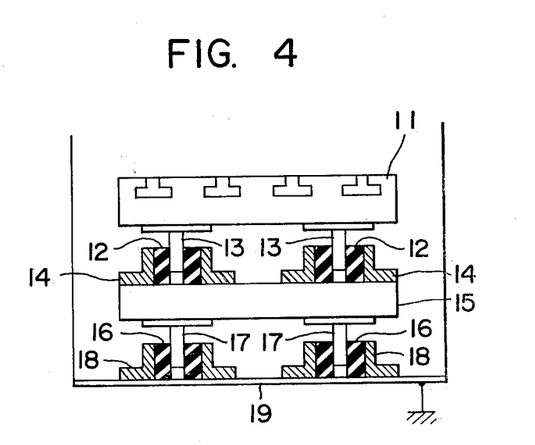
FIG. 4 is a sectional view in elevation diagrammatically illustrating an electrode (tool or workpiece) fixture arrangement for use in carrying out the present invention.

In FIG. 4 there is shown a worktable support and grounding assembly which can be used as a portion of the general arrangement of FIG. 3 in embodying the principles of the present invention whereby the stray capacitance in that portion is reduced to be at most 100 picofarads. In the assembly shown, an electrically conductive (metal) worktable 11 is energized by one cable (4b) from an EDM pulse generator (3) to energize in turn an electrically conductive workpiece (not shown) fixedly supported thereon by mechanical, vacuum, magnetic or the like attachment means (not shown). The worktable 11 is supported by a plurality of parallel posts 13 of an electrically conducting material (metal), each of which may be threaded into and is movably or fixedly received in a corresponding hollow bushing 12 of an insulating material such as glass, resin or stone which is in turn fixedly received in a corresponding block 14 of an electrically conductive material (metal). The blocks 14 are in turn supported on an electrically conductive (metal) plate 15 in contact thereto. The plate 15 just like the table 11 is in turn supported by further parallel posts 17 of an electrically conductive material (metal), each of which may be threaded into and is movably or fixedly received in a corresponding hollow bushing 16 of an insulating material such as glass, resin or stone which is in turn fixedly received in a corresponding block 18 of an electrically conductive material (metal). The blocks 18 are in turn supported on a metallic base plate 19 which is grounded as shown.

The bushings 12 and 16 provide relatively narrow areas of insulation and thus are capable of reducing the stray capacitances in the assembly to a minimum. Furthermore, the distance between the workpiece energizing table 11 and the ground is greatly increased. The stepped insulator 12, 16 arrangement is therefore particularly advantageous to reduce the capacitance at this site to a minimum without practically reducing the mechanical strength of the workpiece supporting structure. The two-step arrangement in series as shown of an insulation unit 12, 16 reduces the total capacitance to one half. More than two steps of an insulation may be used to further reduce the total capacitance. While any rigid insulating material may be used to compose the bushings 12 and 16, stone or ceramic has been found to be particularly advantageous.

Figure 5:
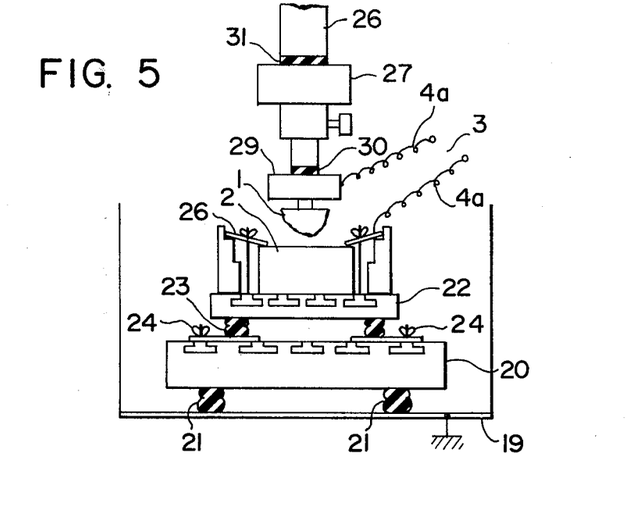
FIG. 5 is a diagrammatic sectional view in elevation illustrating a modification of the embodiment of FIG. 4.

FIG. 5 shows another embodiment of the present invention designed to limit the capacitance at those portions in the gap discharge circuit where the tool electrode 1 and the workpiece 2 are electrically energized by the pulse generator and insulated from ground. In this embodiment, an electrically conductive main worktable 20 is shown supported by a plurality of insulators 21 adapted to electrically insulate it from the grounded machine base 19. Further insulators 23 rest on the main worktable 20 and support an electrically conductive auxiliary worktable 22 to provide an electrical insulation therebetween. The workpiece 2 is secured on the auxiliary table 22 by a plurality of electrically conductive clamps one of which, as shown, is connected to one cable 4b from the pulse generator 3 of FIG. 2. The insulators 23 are secured to the main table 20 by means of a clamp unit 24.

The two-step insulation arrangement here again reduces the total capacitance in the workpiece support and grounding assembly one half. The auxiliary worktable 22 is removably secured above the main worktable 20. This arrangement allows the auxiliary unit 22, 23 to be selectively mounted on the main unit 20, 21 when a finish EDM operation is desired so as to carry the workpiece 2 thereon to reduce the total capacitance in the assembly to a minimum. Where a rough EDM operation is to be performed, the influence of the stray capacitance in the gap discharge circuit on machining discharge pulses is small; then the workpiece can be mounted directly on the main conduction and insulating unit 20, 21 with the clamp unit 24 being connected to the energizing cable 4b from the pulse generator 3.

Directly above the workpiece 2 there is shown the tool electrode 1 juxtaposed therewith and carried by an electrically conductive auxiliary electrode holder 29 connected to one cable 4a from the pulse generator 3. The auxiliary electrode holder 29 is coupled to an electrically conductive main electrode holder 27 by an insulator plate 30 adapted to provide an electrical insulation therebetween. The main electrode holder 27 is coupled to an electrically conductive ram 26 by an insulator plate 31 adapted to provide an electrical insulation therebetween, the ram 26 being grounded. Here again the two-step insulation arrangement reduces the total capacitance in the electrode support and grounding assembly by one half. The auxiliary holder 29 is removably secured below the main holder 27. This arrangement allows the auxiliary unit 29, 30 to be selectively attached to the main unit 27, 31 when a finish EDM operation is desired to carry the tool electrode 1 to reduce the total capacitance in the assembly to a minimum. Where a rough EDM operation is to be carried out, the tool electrode 1 can be directly carried by the main conduction and insulating unit 27, 31 with the main holder 27 being connected to the energizing cable 4a from the pulse generator 3.

In the arrangement of FIG. 5 as well, more than two steps of insulation may be used on each of the tool electrode and the workpiece sides to further reduce the total capacitance. The insulator 21, 23, 30, 31 may be composed of any rigid insulating material and preferably is of ceramic or stone.

In accordance with the present invention, the total stray capacitance in the pulse generator including output cables and the stray capacitance on the electrode and workpiece grounding sides were reduced to 100 picofarads and 10 picofarads, respectively. When, with this gap discharge circuit, a machining operation was conducted to yield a surface roughness of 3 Rmax, the removal rate was 0.012 grams/min and the relative electrode wear was 3%. With a conventional gap discharge circuit, they are 0.003 gram/min and 130%, respectively, for the same surface roughness condition.

The fact that an extremely fine finish EDM operation which allows as fine a finish as 1 to 3 $\mu$Rmax is successfully obtained under a no-wear condition with as low a relative wear as 3% is indeed remarkable in view of earlier beliefs that such would be practically impossible. It will be apparent therefore that the present invention is of extremely high practical utility.

Figure 6:
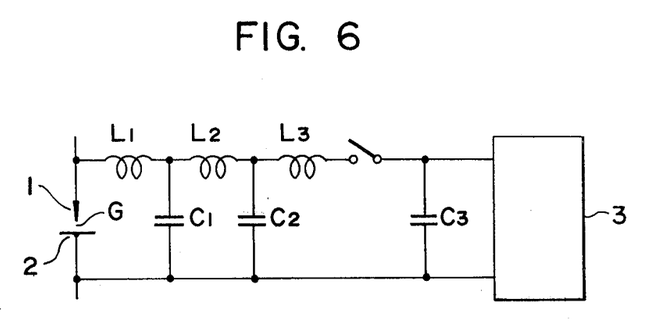
FIG. 6 is a circuit diagram of an EDM gap discharge circuitry shown in the form of an equivalent distributed network and containing stray capacitances as well as stray inductances.
Figure 7:
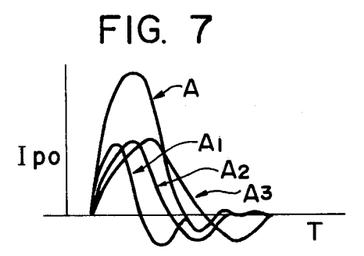
FIG. 7 is a waveform diagram schmatically illustrating three typical discharge current pulses arising from individual portions of the equivalent circuit containing the respective assumed three different distributed stray capacitances and a composite pulse waveform that develops as a result of the summation of the effects thereof.
Figure 8:
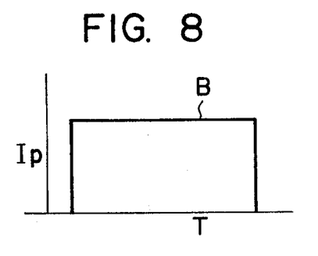
FIG. 8 is a waveform diagram schematically illustrating a rectangular discharge current pulse as an output of a pulsing power transistor to be ideally applied between the tool and workpiece electrodes across the EDM gap.
Figure 9:
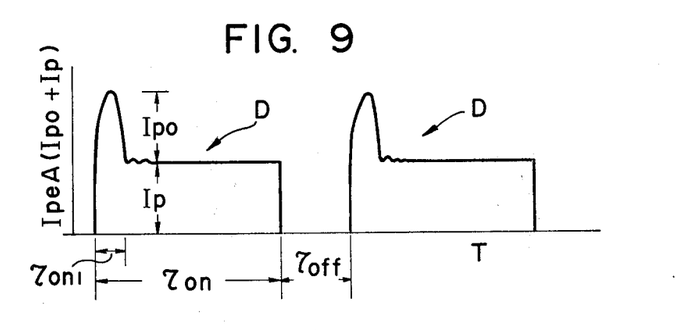
FIG. 9 is a waveform diagram schematically illustrating a composite discharge current pulse which represents an addition of the waveforms of FIG. 7 and 8 and which develops actually across the EDM gap in a conventional system.

FIG. 6 shows an equivalent distributed impedance circuit of the EDM gap discharge circuitry including the tool electrode 1 and the workpiece 2 juxtaposed with one another across the machining gap G and an EDM pulse generator 3 of the semiconductor and particularly a transistor switching type, also commonly known as an independent-type power supply in the EDM art. As noted previously, that type of pulse generator may comprise a DC source and a semiconductor switch, e.g. a bank of parallel connected transistors whose principal electrodes (i.e. emitters and collectors) are connected preferably in series with the DC source and the machining gap G while their control electrodes (i.e. base and emitters) thereof are energizable by a signal pulse generator, e.g. a multivibrator, which provides a succession of switching or signal pulses so that the switch is alternately turned on and off and the output of the source (DC) is intermittently "pulsed" to provide a succession of machining pulses across the EDM gap G. As a result, an electrical discharge of preselected papameter values, i.e. a peak current and a duration, which are basically preset at adjustable settings in the pulse generator 3, is intermittently and repetitively created through the EDM gap G. The term "gap discharge circuit" is used throughout herein to refer to a generator and gap circuit including all circuit elements containing stray capacitances inherently influencing the characteristics of an electrical machining discharge, apart from the presetting of the parameters at those adjustable source portions. Such stray capacitances are represented at distributed capacitances C1, C2 and C3 in the equivalent circuit of the gap discharge circuit, together with distributed stray inductances L1, L2 and L3, each pair of capacitance and inductance: C1 and L1, C2 and L2 and C3 and L3 forming a damping oscillatory network. If a total stray capacitance of 0.015 microfarad is present in the entire gap discharge circuit, it is reasonable to assume that C1=0.003 microfarad, C2=0.005 microfarad, C3=0.007 microfarad; L1=0.1 microhenry, L2=L3=1 microhenry. Then it is seen that the three L-C networks oscillate at frequencies of 50 MHz, 14 MHz and 11 MHz, respectively, with the three individual current waveforms A1, A2, A3 which are summed or added together to form a composite waveform A across the machining gap (G) as diagrammatically shown in FIG. 7. The composite wave A has the peak current $I_{po}$ amounting to 9 amperes and the duration $\tau on1$ amounting to 0.5 to 1 microsecond when the current source (DC) of the pulse generator 3 has an output voltage of 90 volts. The composite wave A is added to the rectangular waveform B which occurs across the gap G if the stray capacitance in the entire gap discharge circuit is assumed to be zero to develop an actual waveform as shown by each of the distorted pulses D in FIG. 9 as described earlier in connection with FIG. 1.

It has been pointed out hereinbefore that EDM end parameters, as formulae (3) and (4) for surface roughness R and removal rate W and also the experimental findings represented in the graph of FIG. 2 demonstrate, are vitally affected by the presence of and a change in the effective peak current $I_{peff}$ as well as the effective pulse duration $\tau$on. Thus, if there is a shift in the values of these input parameters due to the presence of stray capacitances in the gap discharge circuit, a desired machining result is not obtainable. I have found further that such a shift may even occur with a given circuit design and thus during a given course of machining operation due to a change in the electrode size, the juxtaposed electrode area, the electrode material, the temperature of the dielectric, the degree of dielectric contamination, the effective number of switching transistors in the discharge circuit and so forth.

Figure 10:
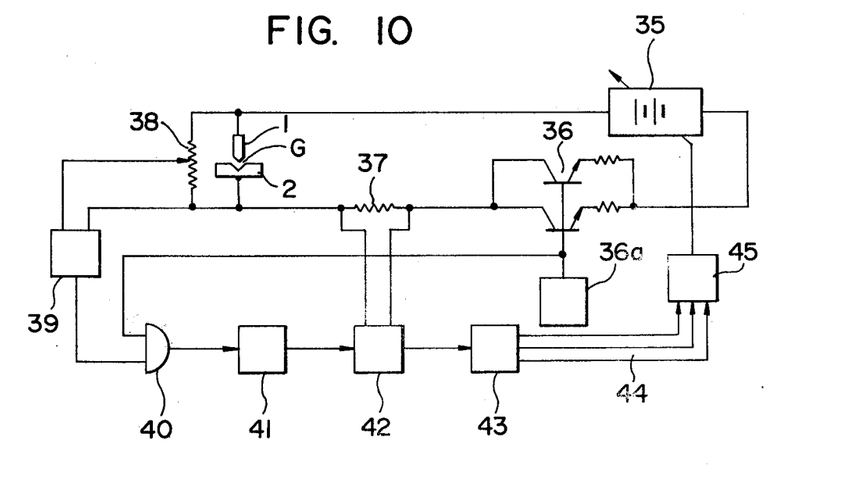
FIG. 10 is a circuit diagram schematically illustrating an embodiment of the invention for ensuring constancy of the initial peak current of the machining discharge pulses irrespective of change in the amount of stray capacitance during a given course of machining operations.

In FIG. 10, there is shown an EDM power supply for further embodying the present invention whereby a change in the stray capacitance in the gap discharge circuit during a given course of machining operation is effectively compensated for. The power supply comprises a DC source 35 and a transistor switch unit 36 which together form the pulse generator connected to the tool electrode 1 and the workpiece 2. The DC source 35 is here capable of varying its output voltage in response to a control signal as will be described. The gap discharge circuit includes a sensing resistor 37 for monitoring the discharge current passing through the machining gap G between the tool electrode 1 and the workpiece 2. A further sensing resistor 38 is connected across the machining gap G to respond to the gap voltage and feed into a discriminator 39 which is adapted to provide an output "1" signal when each gap discharge is initiated as the power switch 36 is turned on by a signal pulse furnished from a signal source timer 36a. The latter's signal pulse or "1" signal and the "1" output signal of the discriminator 39 when they both develop enables an AND gate 40 to actuate a timer 41. The timer 41 then provides a short monitoring pulse designed to appear only at an initial portion of the gap discharge and thereby to enable a gate 42 to be responsive to the gap current sensed by the resistor 37 only during that period. A multi-level discriminator 43 (which may comprise a plurality of Schmitt triggers) having a plurality threshold values preset therein is responsive to the detected gap current and, when the latter exceeds one or another of the threshold levels, provides a corresponding signal which is applied along its given channel 44 to an actuator 45 associated with the DC source 35.

The additional peak current $I_{po}$ described hereinbefore develops in an initial period $\tau$on1 of each gap discharge D (FIG. 9) as a result of the fact that the electrostatic energy stored during the pulse interval $\tau$off on a stray capacitance (capacitor) in the gap circuit is discharged through the machining gap G when the power switch 36 is turned on. Consequently, the increased effective peak current $I_{peff}$ or $I_{p1} = I_{po} + I_p$ which thus develops at the initial pulse period $\tau$on1 is dependent on and varies with the actual value of the stray capacitance. The multi-level discriminator 43 is adapted to be responsive to divided ranges of the magnitude of the initial peak current $I_{peff}$ or $I_{p1}$ and provide the signals respectively corresponding to the monitored ranges. The actuator 45 is responsive to these signals and act on the voltage source 35 such that when a greater initial peak current $I_{po}$ is detected, its output voltage may be reduced to a given value and when a smaller initial peak current $I_{po}$ is detected, its output voltage may be increased to a greater value. Thus, the output voltage of the DC source 35 should be controlled so as to maintain the effective peak current $I_{peff}$ at the initial period $\tau$on1 over successive pulses substantially constant, in spite of in-process changes in the value of stray capacitances in the gap discharge circuit.

There is thus provided an improved EDM method and apparatus for machining a workpiece with a tool electrode whereby increased machining performance in terms of removal rate, surface roughness, relative electrode wear and machining precision is attained.

What is claimed is:

1. A method of the electrical-discharge-machining of a workpiece electrode juxtaposed with a tool electrode across a machining gap flooded with a liquid dielectric, said method comprising the steps of:

applying a succession of machining current pulses across the machining gap through a gap discharge circuit by repetitively pulsing the output of a DC source by means of a semiconductor switching unit, said gap discharge circuit including said semiconductor switching unit, leads in said unit, cables which connect said DC source to said unit, and said DC source and said unit to a vicinity of said machining gap, conductors in said vicinity which lead from said cables for directly energizing said tool electrode and said workpiece electrode and having stray capacitances distributed therein, each of said machining current pulses having an increased peak current at an initial portion thereof due to the fact that an electrostatic energy stored on said distributed stray capacitances during the preceding pulse interval is discharged through said machining gap when said machining pulse is delivered to said gap; and controlling said initial increased peak current to a minimum by limiting the total value of said distributed stray capacitances in said gap discharge circuit not to exceed 0.01 microfarad.

2. A method as defined in claim 1 wherein the total value of said distributed stray capacitances is limited not to exceed 0.005 microfarad.

3. A method as defined in claim 2 wherein the total value of said distributed capacitances is limited not to exceed 0.001 microfarad.

4. A method as defined in claim 1 wherein said liquid dielectric is a distilled or weakly conductive aqueous liquid.

5. An apparatus for the electrical-discharge-machining of a workpiece electrode juxtaposed with a tool electrode across a dielectric filled machining gap, comprising:

a DC source;

a semiconductor switching unit operable to repetitively pulse the output of said DC source for providing a succession of machining current pulses across the machining gap though a gap discharge circuit, said gap discharge circuit including said semiconductor switching unit, leads in said unit, cables which connect said DC source to said unit, and said DC source and said unit to a vicinity of said machining gap, conductors in said vicinity which lead from said cables for directly energizing said tool electrode and said workpiece electrode and having stray capacitances distributed therein, each of said machining current pulses having an increased peak current at an initial portion thereof due to the fact that an electrostatic energy stored on said distributed stray capacitances during the preceding pulse interval is discharged through said machining gap when said machining pulse is delivered to said gap; and means for limiting the total value of said distributed stray capacitances in said gap discharge circuit not to exceed 0.01 microfarad, thereby controlling said initial increased peak current to a minimum.

6. An apparatus as defined in claim 5 wherein said limiting means is operable to limit said total value not to exceed 0.005 microfarad.

7. An apparatus as defined in claim 6 wherein said limiting means is operable to limit said total value not to exceed 0.001 microfarad.

8. An apparatus as defined in claim 6, further comprising means for flooding said machining gap with a distilled or weakly conductive aqueous liquid constituting said liquid dielectric.

9. An apparatus for the electrical-discharge-machining of a workpiece electrode juxtaposed with a tool electrode across a dielectric filled machining gap, comprising:

(a) a DC source; and
(b) a semiconductor switching unit operable for repetitively pulsing the output of said DC source to provide a succession of machining current pulses across the machining gap through a gap discharge circuit, said gap discharge circuit including a plurality of pairs of electrical conductors each separated by an insulating layer and including:

a pair of conductors disposed on a printed circuit board or a plurality of printed circuit boards in a pulse generator unit containing said semiconductor switch unit, one of which conductors is on the printed circuit board or one of the printed circuit boards and the other of which conductors is juxtaposed with said conductor in a mutually insulating relationship, and which conductors form a portion of said pulse generator unit;

a pair of cables electrically connecting the output terminals of said pulse generator unit respectively to said tool and workpiece electrodes;

a pair of conductors one of which is on the side of said tool electrode and adapted to electrically energize the same from the corresponding one of said cables and the other of which conductors is electrically separated from said one conductor and connected to ground; and a pair of conductors one of which is on the side of said workpiece electrode and adapted to electrically energize the same from the corresponding one of said cables and the other of which conductors is electrically separated from said one conductor and connected to ground wherein the distance between at least one of said pairs of conductors is so large that the total stray capacitance of said gap discharge circuit is not greater than 0.01 microfarad.

10. An apparatus as defined in claim 9 wherein the stray capacitance across said conductors on both sides of said tool electrode and workpiece electrode energized by said cables and connected to ground is at most 100 picofarads.

11. An apparatus as defined in claim 10 wherein each pair of said conductors at said tool electrode and workpiece electrode has therebetween a first insulator in contact with said one conductor, a third conductor in contact with said first insulator and thereby electrically separated from said one conductor and a second insulator disposed in contact between said third conductor and said other conductor for electrically separating them.

12. An apparatus as defined in claim 10 wherein each pair of said conductors at said tool electrode and workpiece electrode includes a first insulator in contact with said other conductor and has, between said one conductor and said first insulator, at least one pair of a second insulator and a third conductor in a mutually contacting relationship, said second insulator being disposed in contact with the adjacent conductor other than said third conductor and said third conductor being disposed in contact with the adjacent insulator other than said second insulator.

13. An apparatus as defined in claim 12 wherein said at least one pair of a second insulator and a third conductor is removable for selective insertion between said one conductor and said first insulator preparatory to an EDM operation under finishing conditions.

14. An apparatus as defined in claim 12 or claim 13 wherein at least one of said first and second insulators is composed of a ceramic or stone while said one, another and third conductors are composed of a metal.

15. An apparatus for the electrical-discharge-machining of a workpiece electrode juxtaposed with a tool electrode across a dielectric filled machining gap, comprising:

a DC source;
a semiconductor switching unit operable for repetitively pulsing the output of said DC source to provide a succession of machining current pulses across the machining gap through a gap discharge circuit having stray capacitances, each of said machining current pulses having an increased peak current at an initial portion thereof due to the fact that an electrostatic energy stored on said stray capacitances or a capacitor equivalently constituted thereby during the preceding pulse interval is discharged through said machining gap;
means for measuring the magnitude of said initial peak current; and
means in response to the measured value of said magnitude for controlling the output voltage of said DC source so as to maintain said initial peak current substantially constant, irrespective of a change in the stray capacitance value being not greater than 0.01 microfarad in said gap discharge circuit during a given course of machining operation.

16. A method of the electrical-discharge-machining of a workpiece electrode juxtaposed with a tool electrode across a machining gap flooded with a liquid dielectric, said method comprising the steps of:

(a) applying a succession of machining pulses across the machining gap through a gap discharge circuit by repetitively pulsing the output of a DC source with a semiconductor switching unit, said discharge circuit including a plurality of pairs of electrical conductors, each of which pairs are separated by an insulating layer, and including:

a pair of conductors on a printed circuit board or on a plurality of printed circuit boards, one of which conductors is on the printed circuit board or one of the printed circuit boards and the other of which conductors is juxtaposed with said one conductor in a mutually insulating relationship, and which conductors form a portion of a pulse generator unit containing said semiconductor switching unit, a pair of cables electrically connecting the two output terminals of said pulse generator unit respectively to said tool and workpiece electrodes;

a pair of conductors one of which is on the side of said tool electrode and adapted to electrically energize the same from the corresponding one of said cables and the other of which is electrically separated from said one conductor and connected to ground, and a pair of conductors one of which is on the side of said workpiece electrode and adapted to electrically energize the same from the corresponding one of said cables and the other of which is electrically separated from said one conductor and connected to ground; and (b) limiting distortion of each of said machining pulses applied across said machining gap to a minimum by enlarging the distance between at least one of said pairs of conductors so that said discharge circuit has a total stray capacitance not greater than 0.01 microfarad.

17. The method defined in claim 16 wherein said total stray capacitance is at most 0.005 microfarad.

18. The method defined in claim 16 wherein said total stray capacitance is at most 0.001 microfarad.

19. The method defined in claim 16 wherein said liquid dielectric is a distilled or weakly conductive water liquid.

20. The method defined in claim 16, further comprising limiting the sum of the stray capacitance across said conductors on the both sides of said tool electrode and said workpiece electrode to at most 100 picofarads.

21. A method of the electrical-discharge-machining of a workpiece electrode juxtaposed with a tool electrode across a machining gap flooded with a liquid dielectric, said method comprising the steps of:

(a) applying succession of machining pulses across the machining gap through gap discharge circuit by repetitively pulsing the output of a DC source with a semiconductor switching unit, said gap discharge circuit having stray capacitances, each of said machining pulses has an increased peak current at an initial portion thereof due to the fact that an electrostatic energy stored on said stray capacitances or a capacitor equivalently constituted thereby during the preceding pulse interval is discharged through said machining gap when said machining pulse is applied to said gap;

(b) measuring the magnitude of said initial peak current; and (c) in response to the measured value of said magnitude, controlling the output voltage of said DC source to maintain said initial peak current substantially constant, irrespective of a charge in the stray capacitance value in said gap discharge circuit being not greater than 0.01 microfarad during a given course of machining operation.

22. A method of electrical-discharge-machining a workpiece electrode juxtaposed with a tool electrode across a machining gap flooded with a liquid dielectric, said method comprising:

(a) applying a succession of machining voltage pulses across the machining gap through a gap discharge circuit having distributed stray capacitances by repetitively pulsing the output of a direct-current source with a semiconductor switching unit, each of said machining voltage pulses resulting in a discharge current pulse having an increased peak current at an initial portion thereof due to the fact that an electrostatic energy stored on said distributed stray capacitances or a capacitor equivalently constituted thereby during the preceding pulse interval is discharged through said machining gap when said voltage pulse is applied to said gap;

(b) measuring the magnitude of said initial peak current; and (c) in response to the measured value of said magnitude, controlling the output voltage of said direct-current source so as to maintain said initial peak current substantially constant, irrespective of a change in said distributed stray capacitances in said gap discharge circuit during a given course of machining operation.

23. The method defined in claim 22 wherein said liquid dielectric is a distilled or weakly-conductive water liquid.

24. An apparatus for electrical-discharge-machining a conductive workpiece with a tool electrode across a machining gap, said apparatus comprising:

means for supplying a liquid dielectric to said machining gap;

a direct-current source;

a semiconductor switching unit operable for repetitively pulsing the output of said direct-current source to provide a succession of machining voltage pulses across said machining gap through a gap discharge circuit having therein distributed stray capacitances, said voltage pulses resulting individually in a discharge current pulse at said gap having an increased peak current at an initial portion thereof due to the fact that an electrostatic energy stored on said distributed stray capacitances or a capacitance equivalently constituted thereby during the preceding pulse interval is discharged through said machining gap when said voltage pulses are individually applied to said gap;

means for measuring the magnitude of said initial peak current; and means in response to the measured value of said magnitude for controlling the output voltage of said direct-current source so as to maintain said initial peak current substantially constant, irrespective of a change in said distributed stray capacitances in said gap discharge circuit during a given course of machining operation.

25. An apparatus as defined in claim 24 wherein said supply means comprises means for supplying a distilled or weakly conductive water liquid as said liquid dielectric to said gap machining.

* * * * *